O'Connor & Collins.

Excavator.

Nº 79,851. Patented Jul. 14, 1868.

Witnesses:

Inventors:
Patrick O'Conor & Morris Collins:
per A. V. B. Stoughton,
Attorney

United States Patent Office.

PATRICK O'CONNOR AND MORRIS COLLINS, OF DECATUR, ILLINOIS.

Letters Patent No. 79,851, dated July 14, 1868.

IMPROVEMENT IN DITCHING-MACHINES.

*The Schedule referred to in these Letters Patent and making part of the same.*

TO ALL WHOM IT MAY CONCERN:

Be it known that we, PATRICK O'CONNOR and MORRIS COLLINS, of Decatur, in the county of Macon, and State of Illinois, have invented certain new and useful Improvements in Ditching-Machines; and that the following is a full, clear, and exact description of the same, reference being had to the accompanying drawings, making a part of this specification, in which—

Similar letters of reference, where they occur in the drawings, denote like parts of the machine.

The nature and purpose of our invention is to construct a ditching-machine in such a manner that the ditching-apparatus or plow, with its accompanying mould-boards, can be raised or lowered to the desired depth, while operating the machine, to suit the different inequalities of the land, by simply turning a screw fastened to the plow and passing through the beam of the machine.

To enable others skilled in the art to make and use our invention, we will proceed to describe the same with reference to the drawings.

A represents the beam, to which is attached the tractive power, by means of the clevis B. This beam has on its rear portion two arms, $a\ a$, kept apart in the form of a V by the cross-piece $b$, the purposes of which will be explained hereafter. C is the plow or ditching-shoe, of an oval form, carrying two mould-boards, D D, hinged to the plow at $d$. These mould-boards are curved or inclined upwards and outwards from the centre, so as to carry and deliver the excavated dirt at a distance from the ditch. This delivery is further extended and completed by two adjustable wings, E E, hinged at $e\ e$ to the arms $a\ a$ of the beam A. The adjustment of the wings E E is made by means of two braces, $f\ f$, pivoted at $g\ g$ to the rear of the said wings, and kept extended out by the pin $h$ passing through holes in the braces and through the beam A, in this manner locking them in any position desired.

Figure 1:
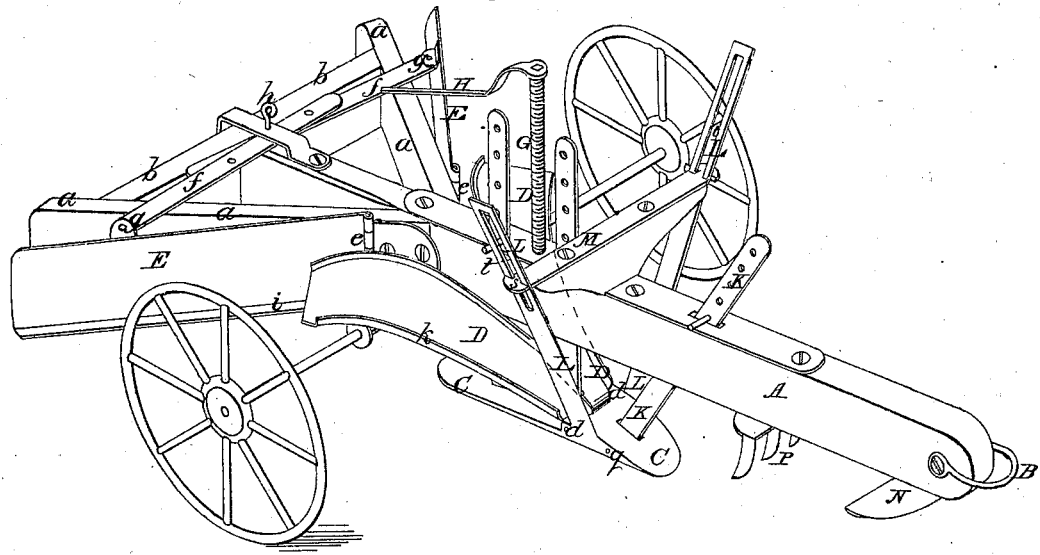
Figure 1 represents a perspective view of the machine.
Figure 2:
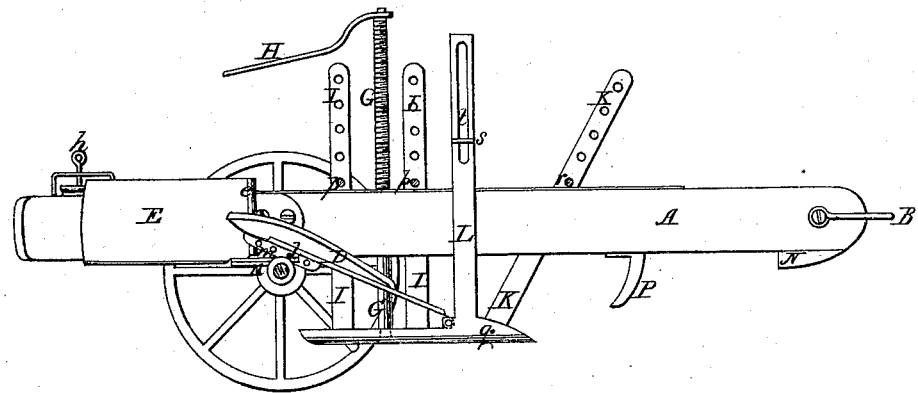
Figure 2 represents a side elevation with one of the wheels removed.

The wings E E are bent forward in their lower portion, as shown at $i$, so as to support the earth while carrying it out of the way. The mould-boards D D are also bent at their edges $k\ k$, so as to afford a better guide to the dirt. They are kept in proper position by the pin $l$, seen in fig. 2, passing through some one of the adjustable holes in the projection $m$ of the mould-boards, and also between the beam A and the rest $n$.

G is a screw, with its head fitting into a hole countersunk in the under side of the plow C, and passing through the beam A. This screw carries, at its upper extremity, a lever-handle, H, by which it is turned round, and consequently raised or lowered, producing corresponding motions in the plow.

I I are two adjustable vertical guides, fastened to the plow C, which pass through the beam A, and connect the beam and the plow together, also relieving the pressure from the screw by means of two pins, $p\ p$, passing through the adjustable holes on their sides.

K is a brace, pivoted to the plow at $q$, having also adjustable holes, through which passes the pin $r$. This brace has its forward side knife-edged, so as to divide the dirt into two parts, one for each mould-board.

L L are two knives, attached to each side of the plow, to cut the sides of the ditch. These knives are kept apart in the form of a V by the cross-piece M, having a collar and head, $s$, at each extremity, fitting into a slot, $t$, cut out in the knife-standards L.

The machine having been brought to the field where it is intended to operate it, the wheels and axle are removed, and the team or other tractive power being applied to the beam A, its forward end, with its shoe N, resting on the ground, and the rest $n$ supporting the after end of the machine, the plow enters the sod, which is cut in advance of it by the three-bladed cutter P, the earth is divided into two slices by the knife K, and is gradually raised from the ditch by the plow C, which cuts it loose at the bottom, and the two mould-boards D D, and then spread out further from the ditch by the two wings E E.

When it is desired to make the ditch deeper, the pin $l$, fastening the mould-boards, and the pins $p\ p$ and $r$, holding the braces, are removed, the screw turned down, and the pins $l$, $p\ p$, and $r$, inserted into higher holes. When it is desired to make the ditch shallower, the reverse operation is performed.

Having thus fully described my invention, what I claim, is—

In combination with the beam A and the plow C, the mould-boards D, knives K and L, screw G, and guides I, so that the whole may be moved and adjusted by said screw, substantially as specified and for the purpose set forth.

PATRICK O'CONNOR,
MORRIS COLLINS.

Witnesses:
AUGUST HEBENSTREIT,
JAMES O'CONNOR.